2,938,119
RADIOACTIVITY ANALYSIS

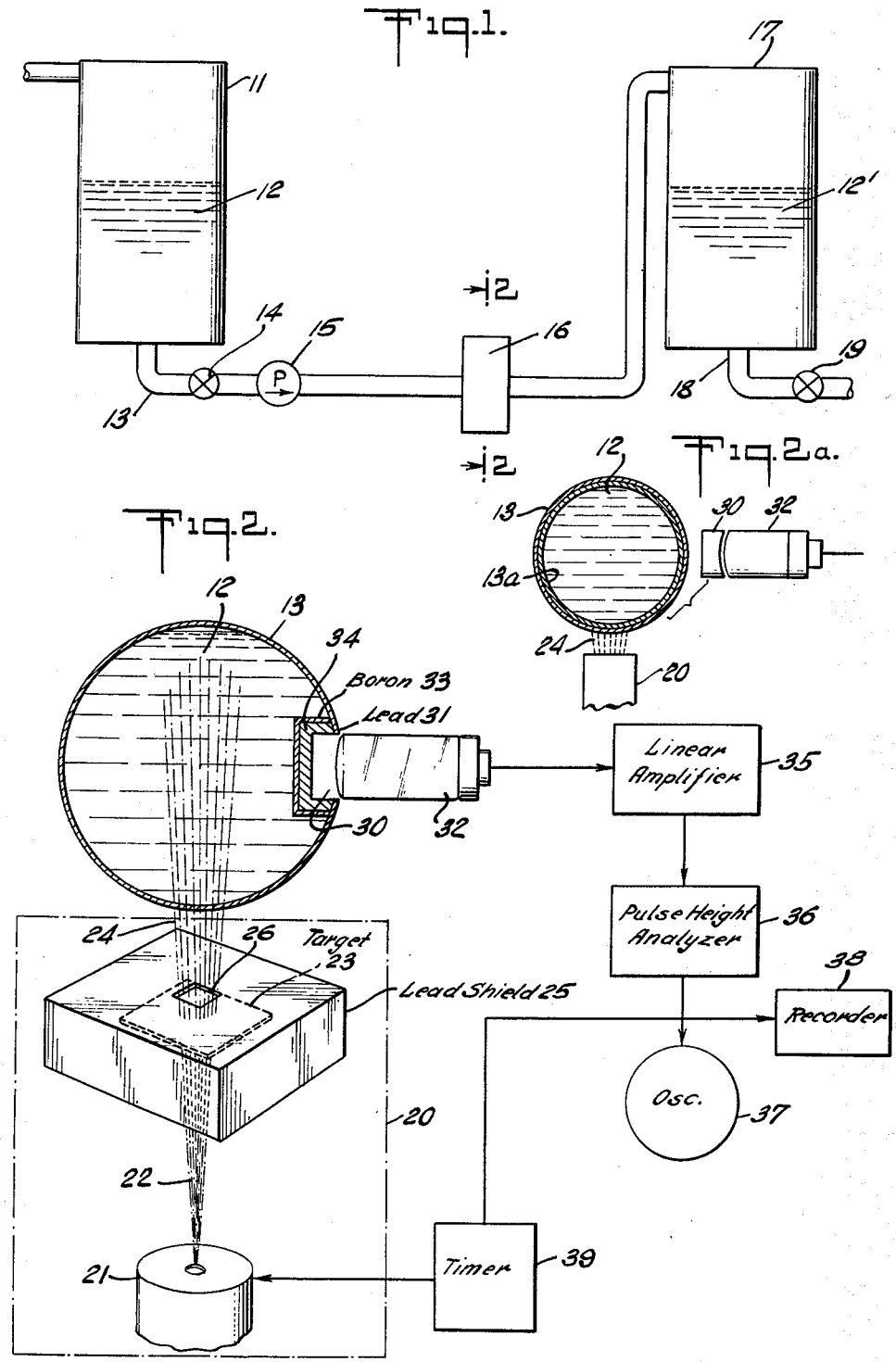

Alexander S. McKay, Bellaire, Tex., assignor to Texaco Inc., a corporation of Delaware Filed Oct. 8, 1956, Ser. No. 614,718

7 Claims. (Cl. 250—43.5)

The present invention relates generally to the analysis of material for the presence of certain constituents contained therein. More particularly, the invention is concerned with such analysis by irradiating a sample of the material with neutrons and detecting gamma radiation emanating therefrom as an indication of the presence therein of the suspected constituent(s). The invention is of particular utility as applied to the continuous analysis of a stream of hydrocarbons for the presence of certain contaminants.

It is a general object of the present invention to provide improved means for determining the presence of certain contaminants in a sample through the irradiation thereof with neutrons and detection of penetrative radiation emanating therefrom.

It is known that certain contaminants, such as vanadium, can be detected in crude oil through a technique known as activation analysis. By this technique, a sample to be analyzed is irradiated with neutrons for a comparatively long time, frequently of the order of minutes, in order to induce a radioactive condition in the sample. Subsequently, the delayed radiation emanating from the sample is detected and analyzed in order to determine the presence therein of the contaminant.

The aforementioned analysis technique affords a useful means for analyzing crude oil for the presence of vanadium; however, it is often desirable to determine additional information concerning other contaminants present in crude oil and it is further desirable to obtain this information more quickly and in a manner that may be applied to a continuously flowing stream of the crude oil. Thus, it is another object of the invention to provide for the continuous analysis of a flowing stream of crude oil for the presence of certain contaminants.

It is desirable in certain instances, to analyze hydrocarbon material, such as crude oil, for example, for the presence of chromium and nickel. It may also be desirable to determine the presence therein of iron or chlorine. Accordingly, it is a further object of the present invention to provide improvements in radioactivity analysis for determining the presence of chromium and nickel in crude petroleum products. It is still a further object of the invention to provide improvements in the analysis of petroleum products that may be useful in determining the presence therein of iron or chlorine.

In general, the present invention contemplates an analysis technique wherein thermal neutrons are caused to interact with certain contaminants in a sample being analyzed in order to produce prompt neutron-capture gamma rays of predetermined characteristic energy level. The prompt neutron capture gamma rays thus produced are detected as an indication of the contaminant.

Briefly stated, in accordance with a preferred aspect of the present invention, a sample of material capable of thermalizing fast neutrons is irradiated with fast neutrons and neutron-capture gamma rays emanating from the sample and having certain characteristic energy levels are detected as an indication of the presence of certain contaminants in the sample. More specifically, a hydrocarbon sample is irradiated with fast neutrons in such manner that the hydrocarbon material thermalizes a substantial number of neutrons with the resultant production of thermal neutrons, some of which may interact with nuclei of certain contaminants to produce prompt neutron-capture gamma rays of predetermined characteristic energy level. The characteristic gammas are detected to the substantial exclusion of radiation of lower energy as an indication of the presence of the contaminants in the sample.

Preferably, the neutron source and the gamma radiation detector are operated alternately during successive intervals of comparatively short duration.

A further aspect of the invention is concerned with the substantially continuous analysis of a flowing stream of material by this technique.

A featured aspect of the invention contemplates the substantially continuous analysis of a flowing stream of petroleum for the presence of nickel and of chromium.

For additional objects and advantages and for a better understanding of the invention, attention is now directed to the following description and accompanying drawings. The features of the invention which are believed to be novel are particularly pointed out in the appended claims.

In the drawing:

Figure 1 is a side-elevational view, partly in cross-section, showing a portion of a fluid flow system including apparatus in accordance with the invention for analyzing fluid passing therethrough;

Figure 2 is a schematic representation of an apparatus for carrying out the present invention as applied to the fluid system of Figure 1 along the lines 2—2 of that figure; and Figure 2a illustrates a modified form of a portion of the apparatus shown in Figure 2.

Referring now to Figure 1, there is shown a portion of a fluid flow system including a first tank 11 containing petroleum 12 suspected of having at least a trace quantity of nickel or chromium contained therein. The tank 11 is provided with an outlet to a conduit 13 including valving means 14 for regulating the flow of crude oil therethrough and a pump 15 for purposes of forced flow. Along the conduit 13 there is located a neutron analysis apparatus represented schematically by the box 16 positioned in operative relationship with the conduit 13 for operation in a manner to be described in greater detail with particular regard to Figure 2. The conduit 13 continues on past the analysis apparatus 16 to a second tank 17 that may be used for storing analyzed petroleum 12' as desired. The second tank 17 is provided with an outlet to a second conduit 18 including a valving means 19 for fluid control in known manner.

Referring now to Figure 2, there is shown a schematic representation of the analyzing apparatus 16 positioned adjacent the conduit 13 shown in cross-section and which contains a sample of petroleum 12 for analysis. The conduit 13 should be formed of material having appropriate structural characteristics to contain the sample under the hydrostatic pressures existing in the system. Moreover, with particular regard to the specific aspects of the invention, the conduit 13 should be relatively permeable to fast-neutrons and should have a comparatively small thermal neutron-capture cross-section. In addition, the material of which the conduit is formed should be one that does not produce a significant number of thermal neutron capture gamma rays of the same energy range as those which may be produced by the suspected contaminant. Aluminum is a preferred material having the desired characteristics.

In accordance with another feature of the invention, as illustrated in Figure 2a, the conduit 13 is provided with a lining 13a of boron, which has a high thermal neutron capture cross section but which does not emit troublesome capture gamma rays that might interfere with gamma radiation from the sample. The conduit 13 may accordingly be formed of material, such as iron, having a larger thermal neutron capture cross section than aluminum. In this case, the luminophor 30 and photomultiplier 32 may be positioned outside the conduit 13 as shown.

On one side of the conduit 13 there is shown a fast neutron source 20, represented diagrammatically. The source 20 may be constructed in accordance with well-known principles and may operate through the acceleration of charged particles against a suitable target. For example, the source may comprise means for accelerating deuterons against a target comprised of tritium or deuterium. In the case of the deuteron-tritium reaction, neutrons are produced having an energy of the order of 14 m.e.v., i.e., 14 million electron volts. In the case of the deuteron-deuterium reaction, neutrons of the order of 2.5 m.e.v. are produced. In Figure 2, there is shown diagrammatically a particle accelerator 21 for projecting a beam of deuterons 22 against an appropriate target in order to produce a neutron beam 24, shown passing from the target 23 through the wall of the container 13 into the petroleum 12. A gamma ray shield 25, formed of lead for example, is shown generally confining the target 23, except for an irradiating aperture 26 between the target 23 and the conduit 13. The purpose of the shield 25 is to prevent gamma rays produced in the target from reaching the other parts of the apparatus, especially the detector as will be discussed below.

A gamma ray detection apparatus of the gamma ray spectrometer type is provided adjacent the conduit 13 in the vicinity of the source 20 in such manner as to observe neutron capture gamma rays produced in the sample 12 by means of the source 20. Preferably, as shown in Figure 2, the detection apparatus comprises a luminophor 30 situated within a suitable opening 31 provided in the wall of the container 13. A photoelectric device such as a photo-multiplier 32 is operatively coupled to the luminophor 30 through the opening 31. The luminophor 30 may appropriately comprise a sodium iodide crystal of adequate size to provide effective detection of the desired gamma radiation. Since the predominant forms of primary gamma interaction in the crystal are due to pair production and Compton scattering the crystal should be of adequate size to absorb as many as possible of the positron annihilations and scattered gammas in the crystal itself in order to afford means for correlating pulse size with the energy of the incident gamma rays. A 2 inch by 2 inch cylinder of sodium iodide is satisfactory. In order to prevent activation of the sodium iodide crystal, appropriate shielding should be provided between the luminophor 30 and the sample under observation. An appropriate shield may comprise an outer layer 33 of boron for intercepting thermal neutrons from the sample and an inner layer 34 of lead in order to prevent 0.5 m.e.v. boron-capture gamma rays from reaching the luminophor 30.

It is to be understood that appropriate operating potentials are to be applied to the photo-multiplier 32 in order to convert gamma-produced scintillations in the luminophor to corresponding electrical pulses. The output of the photo multiplier 32 is coupled in known-manner to a linear amplifier 35 whose function is to enhance the output of the photomultiplier 32 to enable further analysis of the signal. The output of the linear amplifier 34 is, in turn, coupled to a pulse-height analyzer 35 that is preferably of the multi-channel type in order to provide means for analyzing the signal to determine the number of counts, i.e., detected gamma rays, occurring in one or more seleted energy ranges. The output of the pulse-height analyzer 36 is shown coupled to a display device illustrated as an oscilloscope 37 in order to provide means for continuously observing the detected signal. A recorder 38 is also shown coupled to the output of the pulse-height analyzer 36 in order to provide means for making a continuous record of the number of pulses occurring in one or more selected energy ranges as hereinafter discussed. It is to be understood that a rate-meter (not illustrated) may be employed in order to provide a continuous display or record of the average rate of occurrence of detected gamma ray pulses of the selected energy range(s).

A timer 39 is shown coupled to both the source 20 and the output of the pulse-height analyzer 36 and is to be understood to comprise means for controlling the operation of the irradiating source and the signal detection means in accordance with a desired schedule.

In the operation of the above-described apparatus, a beam of neutrons 24 produced by the source 20 is caused to irradiate the sample of petroleum 12 either in the static condition or as it flows through the conduit 13. The neutrons entering the sample are slowed to the thermal range by the moderating action of the sample, thus producing an abundance of thermal neutrons, some of which may interact with the nuclei of nickel or chromium atoms present therein with the resultant production of prompt neutron capture gamma rays having a characteristic energy level. The characteristic prompt gammas are selectively detected by means of the gamma ray spectrometer as an indication of the presence of the nickel and chromium.

The gamma rays emitted by chromium are of the order of 8.3, 8.9 and 9.7 million electron volts. The gamma ray emitted by nickel are of the order of 8.3 and 8.9 million electron volts. These energy ranges are unique insofar as substantial interference from other sources of neutron capture gammas is concerned.

Some of the thermalized neutrons present in the sample may interact with the hydrogen nuclei of the petroleum with the resultant production of 2.2 m.e.v. neutron capture gamma rays. Since hydrogen has a comparatively small thermal neutron capture cross-section, of the order of 0.32 barn, the number of 2.2 m.e.v. gammas thus produced will be fewer than those produced in interaction with a comparable quantity of chromium or nickel, which have thermal neutron capture cross-sections of 2.9 barns and 4.8 barns, respectively. Nevertheless, since a very small percentage of the chromium or nickel may be present in the oil sample, often less than one percent (1%) and perhaps of the order of one (1) part per million, the number of 2.2 m.e.v. gammas may be appreciable as compared with the number of higher energy gammas produced by interaction with the chromium or nickel. Fortunately, however, the 2.2 m.e.v. background gammas can be eliminated from the detected signal through amplitude discrimination in the pulse-height analyzer.

It is noted that the aluminum of the conduit may produce neutron capture gamma rays having an energy of the order of 7.724 m.e.v. and others down to 2.8 m.e.v. The neutron gamma rays due to the presence of the aluminum conduit are limited, however, by the fact that the neutron capture cross-section for aluminum is of the order of .212 barn. Moreover, the interference of the aluminum-produced gamma rays is minimized in the present apparatus by placing the detector luminophor within the sample container in close proximity to the crude itself, rather than in a position outside the container which would increase the likelihood of detection of the aluminum-produced gammas. Moreover, the technique of amplitude discrimination against the aluminum produced gammas in favor of the higher energy chromium and nickel-produced gammas affords further means for eliminating interference from this cause.

A further objective of the invention is to eliminate background gamma radiation that may originate in the neutron source concurrently with the desired neutrons and to avoid background gamma rays due to inelastic interactions with fast neutron from the source. Such background gamma radiation may be avoided in accordance with a further novel aspect of the invention whereby the source and detector are operated during separate, successive brief intervals of time. More particularly, in accordance with this feature of the invention the source is caused to operate, as by means of the timer 39, for a brief interval, followed by a period of inactivity thereof during which time the detector is caused to operate. By this technique, the detection apparatus avoids any background gamma radiation that may originate in the source concurrently with the desired neutrons as well as any inelastic gamma rays due to fast neutrons. The source duration should be of the order of a millisecond which is adequate to permit the thermal neutron population in the media under investigation to reach a maximum inasmuch as the lifetime of the thermal neutrons in the hydrocarbon is a fraction of a millisecond. The detection interval may likewise be of the order of a millisecond, since the thermal neutrons due to the preceding burst of fast neutrons from the source will have been captured within this time interval.

As between the chromium and nickel, it has been determined that the intensity of the nickel-gammas is about twice that of the chromium gammas for equal concentrations of the two nuclei. In order to distinguish between gamma rays produced by chromium and those produced by nickel, it is contemplated within the scope of the invention to adjust the gamma ray spectrometer in order to observe only those gamma rays in the region of 9.7 m.e.v. chromium-produced gammas. Concurrently, another channel of the detector may be adjusted to detect gamma rays throughout the entire range of the chromium produced gammas, which includes the range of the nickel-produced gammas. The two signals may be compared directly or the signal derived from the 9.7 m.e.v. gammas may be subtracted from the total signal covering the 8.3, 8.9 and 9.7 m.e.v. range to give a difference signal. In either event, a proper calibration can be made to yield the contribution of each of the two elements by comparing the 9.7 m.e.v. signal with either the total or difference signal.

The apparatus may be calibrated by analyzing various samples of crude oil having known nickel or chromium concentrations. In the course of calibration, the gain of the photomultiplier and the position of the pulse-height signal may be set so as to count only the relatively high energy induced gammas due to the nickel and chromium in various concentrations. Since the neutron flux may be established at a reasonably constant value, the pulse-height discriminator counting rate will be a measure of the nickel and/or chromium concentration in the sample.

In addition to the detection of chromium and nickel in a petroleum sample, it is further contemplated to detect the presence of iron therein. Iron neutron capture gamma rays have an energy of 7.5 m.e.v. and may thus be detected by establishing the gamma ray detection level in this energy range. However, it is noted that chlorine has a comparatively high thermal neutron capture cross-section, of the order of 32 barns, and produces neutron gamma rays having an energy of 7 to 8 m.e.v. Thus, if present, chlorine may tend to mask iron. Moreover, in the operation of the apparatus for the detection of gamma rays produced by chromium or nickel, the presence of chlorine may cause a substantial background interference. Such interference may be overcome by amplitude discrimination in the detecting apparatus. Apart from amplitude discrimination of the detected signal in the pulse-height analyzer, the background interference due to chlorine may be reduced by deriving a separate signal in the energy range of the chlorine gamma rays, which signal may be subtracted from the total signal of chlorine plus the nickel and chromium signal, either graphically or electrically during the course of the measurement. This may be accomplished by using the chlorine signal as a negative feed-back to neutralize that component from the combined signal.

In certain instances it is useful to determine the presence of chlorine in crude oil and in certain hydrocarbon fractions thereof, as for example, in order to determine the presence therein of certain salts of chlorine, such as sodium chloride. Accordingly, it is contemplated within the present invention to analyze such hydrocarbon material for the presence of chlorine through irradiation of the material with fast neutrons and detection of characteristic chlorine-capture gamma rays. The detection of chlorine in hydrocarbons is facilitated by its comparatively large neutron capture cross-section and by the comparatively high energy of the neutron capture gamma rays emitted thereby.

The detection of chlorine in a hydrocarbon sample may be accomplished concurrently with the detection of other substances contained therein through the use of a detection channel that is operated to detect only neutron capture gamma rays having an energy of 7 to 8 m.e.v. to the exclusion of undesired background radiation of other energy levels.

The techniques of the present invention are of general application in measuring the concentration of various substances in hydrogenous material in instances where the detected material has an appropriate amplitude-distinguishable neutron capture gamma characteristic.

It is further contemplated in accordance with another aspect of the invention to analyze fluorocarbon material for the presence of other substances contained therein either chemically or dissolved or suspended therein. The fluorocarbon media functions as a moderator for the fast neutrons, as in the case of the hydrocarbon media, and offers the advantage that both carbon and fluorine have small thermal neutron capture cross-sections. Thus a fluorocarbon media provides a clearer background than does the hydrocarbon with its 2.2 m.e.v. hydrogen capture gamma rays.

The analysis of fluorocarbons by the present method is of particular utility in producing a measurement of the chlorine content of chlorofluorocarbons. The relatively high thermal neutron capture cross-section of chlorine assures a significant response and the 7 to 8 m.e.v. capture gamma rays emitted thereby may be readily distinguished from the background level.

As a further illustration of the determination of the presence and concentration of a selected constituent in a material capable of moderating fast neutrons, it is contemplated within the scope of the invention to detect elements such as chlorine, chromium, iron, or nickel that may be contained in solution or suspension in water. Water provides the desired moderating action for the fast neutrons. In addition, the hydrogen and oxygen constituents thereof do not produce objectionable neutron capture gamma rays that preclude detection of the selected constituent contained therein. As discussed above with regard to the analysis of a hydrocarbon sample, hydrogen nuclei produce neutron capture gamma rays having an energy on the order of 2.2 m.e.v. and which can be effectively discriminated against when analyzing for materials such as those discussed above having a characteristic neutron gamma response of significantly higher energy. Similarly, the neutron capture gamma ray response of oxygen in a water media may be readily discriminated against in the detection apparatus.

It will be appreciated in view of the foregoing that the present invention affords definite advantages with respect to prior-art analysis techniques. For example, it requires less time than the activation-type analysis wherein a comparatively long time is required to make the desired measurements. Thus, it will be seen that the present invention lends itself readily to the continuous analysis of a flowing stream of hydrocarbon or fluorocarbon material for certain constituents.

The use of a boron-lined conduit to confine a medium under investigation which is capable of moderating fast neutrons offers the advantage that fast neutrons may readily be transmitted into the counter through the boron lined conduit of iron or the like without undue interference. Within the conduit, the fast neutrons are thermalized in a comparatively homogeneous distribution throughout the sample where they may undergo capture by nuclei of the selected constituent with the resultant production of neutron capture gamma rays of characteristic energy. The prompt gamma rays thus produced may readily pass outwardly from the sample through the conduit wall for detection. However, the thermal neutrons present in the media are effectively confined by the boron lining of the conduit without producing objectionable interference in the form of gamma rays that may interfere with the detected signal.

In accordance with a further embodiment of the present invention, it is contemplated to employ a thermal neutron source rather than the fast neutron source herein illustrated. The use of a thermal neutron source is not equivalent to the use of a fast neutron source, however. Such a thermal neutron source may comprise a fast neutron source as herein illustrated together with an external moderator for converting the fast neutrons to thermal neutrons. The thermal neutron source may also comprise an atomic pile together with appropriate shielding means for directing the thermal neutrons into the material to be analyzed. Although the use of a thermal neutron source does not require that the sample itself be capable of moderating fast neutrons to produce the necessary thermal neutrons, nevertheless this embodiment of the invention lacks certain advantages of a fast neutron source. For example, the use of a fast neutron source to analyze a moderating medium provides a homogeneous distribution of thermal neutrons within the medium. Moreover, the use of a fast neutron source together with an apparatus such as that illustrated in Figure 2A affords the further advantage of confining the thermal neutron flux within the sample under analysis.

While specific embodiments have been shown and described, it will of course be understood that various modifications may be made without departing from the principles of the invention. The appended claims are therefore intended to cover any such modifications within the true spirit and scope of the invention.

I claim:
1. Apparatus for analyzing a medium capable of thermalizing fast neutrons for the presence therein of a certain constituent comprising a container for said medium, a source of fast neutrons adapted and arranged to direct a beam of neutrons into at least a sample of the medium within the container and gamma ray detection apparatus positioned adjacent said container and adapted and arranged to detect gamma rays produced in the medium due to the presence of said constituent, said container being formed of an outer layer comprised of material having a significant gamma ray response due to interaction with thermal neutrons and an inner layer of material characterized by a relatively high thermal neutron capture cross-section and relatively insignificant attendant gamma ray emission in response to the capture of thermal neutrons.

2. Apparatus according to claim 1 wherein said outer layer comprises ferrous material.

3. Apparatus according to claim 1 wherein said inner layer comprises boron.

4. The apparatus of claim 1 wherein the container for the medium under analysis comprises an outer layer of ferrous metal and an inner layer of boron.

5. Apparatus according to claim 1 wherein the source is adapted and arranged to irradiate the medium with successive spaced-apart bursts of fast neutrons and wherein the detection apparatus is adapted and arranged to detect gamma rays emitted from the medium between the successive fast neutron bursts.

6. Apparatus according to claim 1 wherein the gamma ray detection apparatus is adapted and arranged to detect prompt neutron capture gamma rays of predetermined energy level.

7. Apparatus according to claim 6 wherein the gamma ray detection apparatus includes means for deriving a first signal proportional to the detected gamma rays of substantially 9.7 million electron volts, means for deriving a second signal proportional to the detected gamma rays of substantially 8.3 to 8.9 million electron volts, and means for providing a signal display indicative of the relative values of said first and second signals in order to provide correlative data for determining the presence of chromium and nickel in said medium.

References Cited in the file of this patent

UNITED STATES PATENTS

| | | |
|---|---|---|
| 2,744,199 | Juterbock et al. | May 1, 1956 |
| 2,752,504 | McKay | June 26, 1956 |

FOREIGN PATENTS

| | | |
|---|---|---|
| 724,441 | Great Britain | Feb. 23, 1955 |

OTHER REFERENCES

A Glossary of Terms in Nuclear Science and Technology, 1955, The American Society of Mechanical Engineers, page 21.